United States Patent
Honda

(10) Patent No.: US 9,406,051 B2
(45) Date of Patent: Aug. 2, 2016

(54) MOBILE ELECTRONIC DEVICE, NOTIFICATION CONTROL METHOD, AND STORAGE MEDIUM STORING NOTIFICATION PROGRAM

(75) Inventor: Natsuhito Honda, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 895 days.

(21) Appl. No.: 13/295,419

(22) Filed: Nov. 14, 2011

(65) Prior Publication Data

US 2012/0120105 A1     May 17, 2012

(30) Foreign Application Priority Data

Nov. 15, 2010   (JP) .................................. 2010-254892

(51) Int. Cl.
    *G06Q 10/10*     (2012.01)
    *H04M 1/57*     (2006.01)
(52) U.S. Cl.
    CPC ............ *G06Q 10/109* (2013.01); *G06Q 10/107* (2013.01); *H04M 1/575* (2013.01)
(58) Field of Classification Search
None
See application file for complete search history.

(56) References Cited

U.S. PATENT DOCUMENTS

| | | | | |
|---|---|---|---|---|
| 5,262,940 A | * | 11/1993 | Sussman | 705/28 |
| 8,965,457 B2 | * | 2/2015 | Yang | H04M 1/72522 455/415 |
| 2006/0031782 A1 | * | 2/2006 | Houmura et al. | 715/808 |
| 2006/0190832 A1 | * | 8/2006 | Lin et al. | 715/764 |
| 2008/0129555 A1 | * | 6/2008 | Yim | H04M 1/72522 341/24 |
| 2010/0323633 A1 | * | 12/2010 | Pani et al. | 455/67.14 |

FOREIGN PATENT DOCUMENTS

JP     2006-202183 A     8/2006

* cited by examiner

*Primary Examiner* — Jwalant Amin
(74) *Attorney, Agent, or Firm* — Hauptman Ham, LLP

(57) ABSTRACT

A mobile electronic device includes a display unit, a storage unit, and a control unit. The display unit displays a first screen or a second screen. The storage unit stores therein a character string in association with a condition. The control unit displays the character string on the first screen in a superimposed manner in a case where the first screen is displayed on the display unit and the condition is satisfied. The control unit does not display the character string on the second screen in the superimposed manner in a case where the second screen is displayed on the display unit and the condition is satisfied.

12 Claims, 7 Drawing Sheets

FIG.5

| CONDITION TYPE | CONDITION | | DISPLAY CHARACTER STRING | IMAGE DATA | FUNCTION | PARAMETER | DISPLAY STATUS |
|---|---|---|---|---|---|---|---|
| | FIRST CONDITION | SECOND CONDITION | DELETION CONDITION | | | | |
| TIME AND DATE | 10 MINUTES BEFORE | 2010/11/20 15:00 | AFTER 60 MINUTES | CALL TO SUZUKI | phone.ico | phone.call | 09012345678 | 2 |
| LOCATION | WITHIN 500 METERS | 35.670132, 139.744245 | BEYOND 1000 METERS | MAIL TO TANAKA | mail.ico | mail.send | tanaka@example.com | 0 |
| TIME AND DATE | 30 MINUTES BEFORE | 2010/11/22 11:00 | - | MEETING | meeting.ico | - | - | 1 |

24c

MOBILE ELECTRONIC DEVICE, NOTIFICATION CONTROL METHOD, AND STORAGE MEDIUM STORING NOTIFICATION PROGRAM

This application claims priority from Japanese Application No. 2010-254892, filed on Nov. 15, 2010, the content of which is incorporated by reference herein in its entirety.

BACKGROUND

1. Technical Field

The present disclosure relates to a mobile electronic device, a notification control method, and a storage medium storing therein a notification program.

2. Description of the Related Art

There are known electronic devices which have a notification function such as a schedule function or an alarm function. The electronic device which has the notification function stores therein notification data including time and date and character string associated with the time and date, and displays the character string associated with the time and date when the current time and date reaches the time and date stored as the notification data (for example, Japanese Patent Application Laid-Open No. 2006-202183).

The notification according to the above-described related art may be made while a user uses the electronic device to execute a different process. In this case, the notification interferes with the process being executed by the user, and thus the user's convenience may be lowered.

For the foregoing reasons, there is a need for a mobile electronic device, a notification control method, and a storage medium storing therein a notification program capable of performing notification without interfering with the process being executed by the user.

SUMMARY

According to an aspect, a mobile electronic device includes a display unit, a storage unit, and a control unit. The display unit displays a first screen or a second screen. The storage unit stores therein a character string in association with a condition. The control unit displays the character string on the first screen in a superimposed manner in a case where the first screen is displayed on the display unit and the condition is satisfied. The control unit does not display the character string on the second screen in the superimposed manner in a case where the second screen is displayed on the display unit and the condition is satisfied.

According to an aspect, a notification control method is executed by a mobile electronic device including a storage unit and a display unit for displaying a first screen or a second screen. The notification control method includes: storing a character string in association with a condition in the storage unit; determining whether the condition has been satisfied; displaying the character string on the first screen in a superimposed manner in a case where the first screen is displayed on the display unit and the condition is satisfied; and not displaying the character string on the second screen in the superimposed manner in a case where the second screen is displayed on the display unit and the condition is satisfied.

According to an aspect, a non-transitory storage medium stores a notification program executed by a mobile electronic device including a storage unit and a display unit for displaying a first screen or a second screen. The notification program causes the mobile electronic device to execute: storing a character string in association with a condition in the storage unit; determining whether the condition has been satisfied; displaying the character string on the first screen in a superimposed manner in a case where the first screen is displayed on the display unit and the condition is satisfied; and not displaying the character string on the second screen in the superimposed manner in a case where the second screen is displayed on the display unit and the condition is satisfied.

BRIEF DESCRIPTION OF THE DRAWINGS

FIG. 5 is a diagram illustrating an example of notification data;

DETAILED DESCRIPTION

Hereinafter, exemplary embodiments of the present invention will be described in detail with reference to the accompanying drawings. It should be noted that the present invention is not limited by the following description. In addition, this disclosure encompasses not only the components specifically described in the explanation below, but also those which would be apparent to persons ordinarily skilled in the art, upon reading this disclosure, as being interchangeable with or equivalent to the specifically described components.

In the following description, a mobile phone is described as an example of an electronic device, but the present invention is not limited to the mobile phones. For example, the present invention can be applied to a personal handy-phone system (PHS), personal digital assistants (PDA), portable navigation units, personal computers (including but not limited to tablet computers, netbooks etc.), media players, portable electronic reading devices, and gaming devices.

Figure 1:
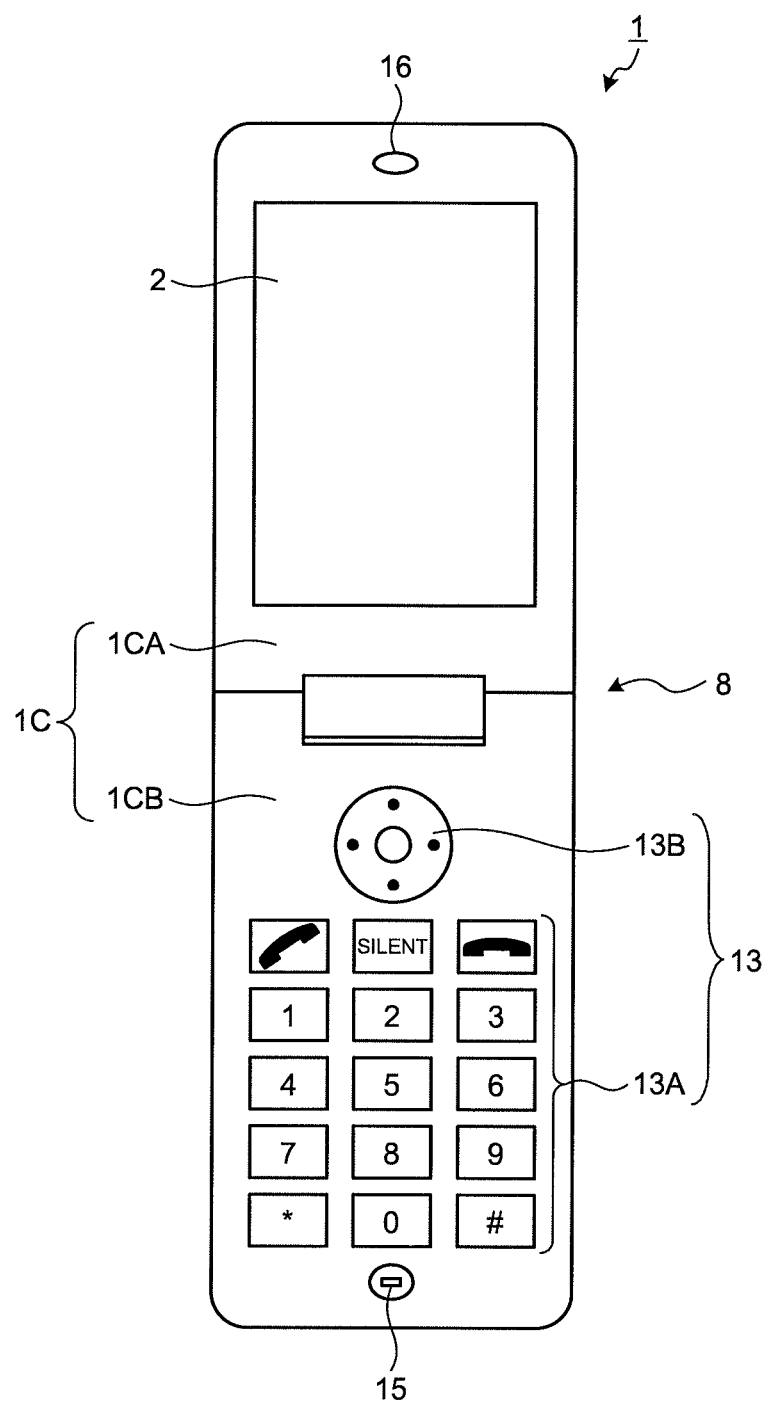
FIG. 1 is a front view of a mobile phone.

First, an overall configuration of a mobile phone 1 as an electronic device according to an embodiment of the present invention will be described with reference to FIG. 1. FIG. 1 is a front view illustrating the external appearance of the mobile phone 1. As illustrated in FIG. 1, in the mobile phone 1, a housing 1C is configured with a plurality of housings. Specifically, the housing 1C can be opened and closed using a first housing 1CA and a second housing 1CB. That is, the mobile phone 1 has a folder-type housing.

The housing of the mobile phone 1 is not limited to this structure. For example, as the housing of the mobile phone 1, there may be employed a slide-type housing in which one housing moves in a sliding manner relative to another housing from a state in which both housings overlap each other. Alternatively, there may be employed a rotation-type housing in which one housing rotates about an axis line along an overlapping direction or a housing in which both housings are connected to each other via a biaxial hinge.

The first housing 1CA and the second housing 1CB are connected by a hinge mechanism 8 that is a connecting unit. Since the first housing 1CA and the second housing 1CB are connected by the hinge mechanism 8, the first housing 1CA and the second housing 1CB can relatively rotate about the hinge mechanism 8.

The first housing 1CA is provided with a display unit 2, and a receiver 16 that is an output unit which outputs a voice during a telephone call. The display unit 2 displays a standby screen or various kinds of functional screens. The functional screen is a screen displayed when various kinds of functions provided by the mobile phone 1 such as a telephone call function or a mail function are being executed. The functional screen is used to receive an instruction on a corresponding function or to present information provided through a corresponding function. The functional screen is an example of a second screen.

The standby screen refers to a screen displayed when various kinds of functions such as the telephone call function and the mail function await activation. That is, the standby screen is a screen which is displayed before various kinds of functional screens provided by the mobile phone 1 are displayed. In other words, the standby screen is a screen that allows the user of the mobile phone 1 to select an application to be executed from among the applications installed in the mobile phone 1. When an application (or an icon of the application or the like) is selected in the standby screen, the mobile phone 1 executes the selected application (or the function corresponding to the selected application) and displays an application screen (or a functional screen) on the display unit 2. The standby screen is also called, for example, an initial screen, a standard screen, a desktop screen, a home screen, or wallpaper. The standby screen or the home screen is an example of a first screen.

In the following description, it is assumed that examples of case where a standby screen 40 is not displayed on the display unit 2 include a case where the display unit 2 is in a non-display mode as well as a case where the functional screen is displayed on the display unit 2. The case where the display unit 2 is in the non-display mode corresponds to, for example, a case where the mobile phone 1 is folded and thus the display unit 2 is covered with the second housing 1CB to be hidden or to a case where power supply to the display unit 2 is temporarily stopped for power saving.

The second housing 1CB includes a plurality of operation keys 13A that are used to enter a call counterpart's telephone number and further includes direction/decision keys 13B that are used to execute a selection of a menu item displayed on the display unit 2 and the like. The operation keys 13A and the direction/decision keys 13B constitute an operating unit 13 of the mobile phone 1. In addition, the second housing 1CB has a microphone 15 disposed therein. The microphone 15 is a voice acquiring unit that receives a voice when a telephone call is performed through the mobile phone 1.

The operating unit 13 may be configured with various kinds of sensors such as a touch sensor or an acceleration sensor, or may be configured with the sensors and a physical key or button such as the operation keys 13A. Alternatively, the operating unit 13 may be configured integrally with another portion such as the display unit 2 like a touch panel.

Figure 2:
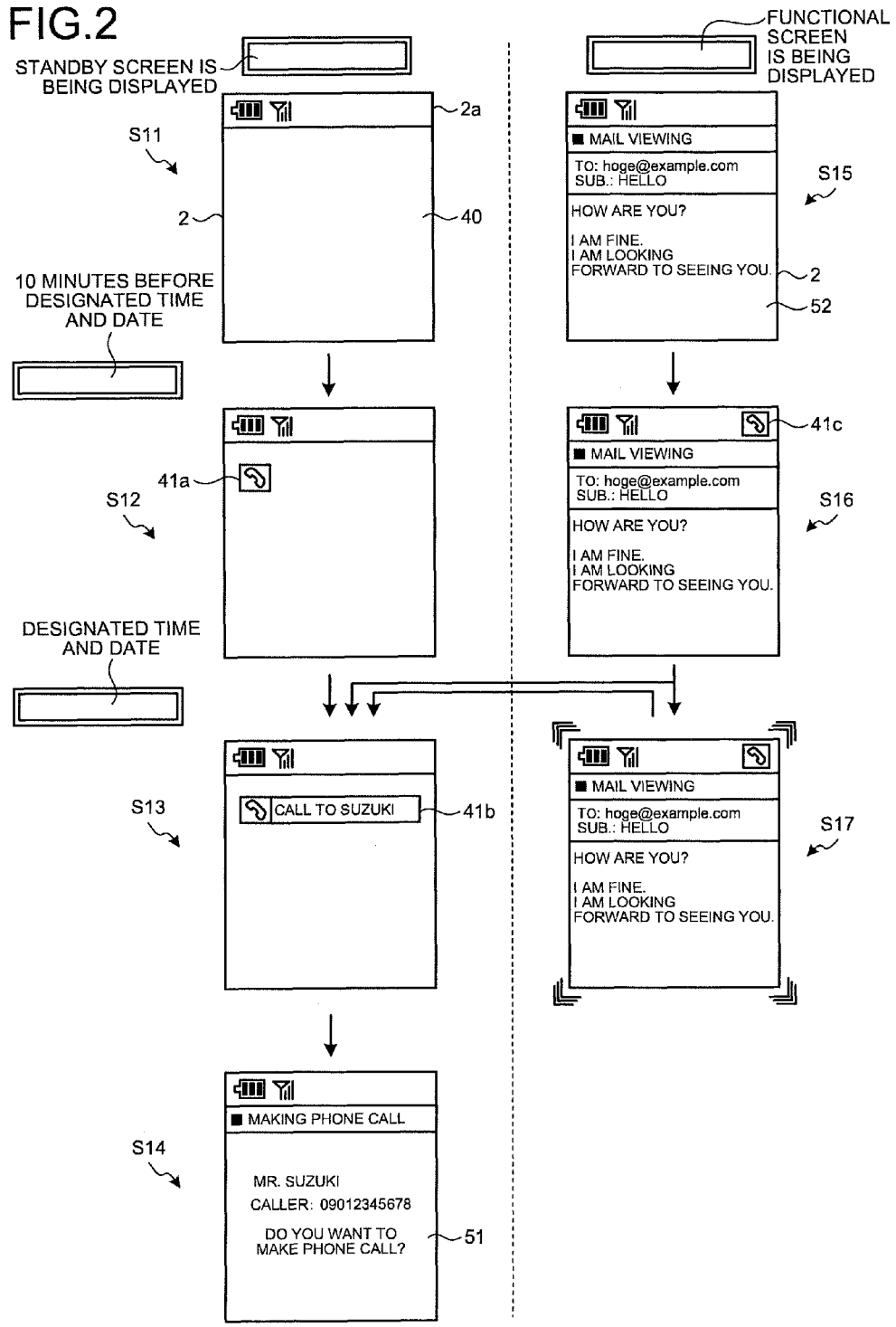
FIG. 2 is a diagram illustrating an example of notification based on a time and date.

Next, the notification function provided by the mobile phone 1 will be described with reference to FIGS. 2 and 3. FIG. 2 is a diagram illustrating an example of notification based on a time and date. In the example illustrated in FIG. 2, it is assumed that the user of the mobile phone 1 is supposed to make a phone call to Mr. Suzuki at a predetermined time. Thus, the mobile phone 1 is set to perform a notification representing that a phone call has to be made to Mr. Suzuki when the designated time and date is reached. In addition, the mobile phone 1 is set to perform a preliminary notification 10 minutes before the designated time and date.

After this setting, for example, the standby screen 40 as illustrated at step S11 is displayed on the display unit 2 of the mobile phone 1. At step S11, a plain background image is displayed as the standby screen 40. A band-like pictography area 2a is disposed in an upper portion of the display unit 2, and images representing a remaining amount of a battery and the intensity of received radio waves are displayed in the pictography area 2a.

When it is 10 minutes before the designated time and date while the standby screen 40 is being displayed on the display unit 2, the mobile phone 1 displays an icon 41a in a superimposed manner on the standby screen 40 according to the setting at step S12. The icon 41a is a relatively small image that occupies a part of the standby screen 40 and includes a symbol of a telephone for suggesting the content of notification to be performed at the designated time.

Then, when the designated time and date is reached in a state in which the standby screen 40 is displayed on the display unit 2, the mobile phone 1 displays a character string 41b of "call to Suzuki" in a superimposed manner on the standby screen 40 by associating with the icon 41a according to the setting at step S13. The character string 41b is linked with a function for making a phone call to a predetermined telephone number. Then, when the icon 41a or the character string 41b is selected by an operation of the operating unit 13, the mobile phone 1 displays a phone call screen 51 on the display unit 2, which is a functional screen for making a phone call to a predetermined telephone number, at step S14.

As described above, when the designated time and date is reached, the mobile phone 1 notifies the user of the advent of the designated time by displaying the previously set character string 41b in the superimposed manner on the standby screen 40. Thus, the user may notice the advent of the designated time and date and the purpose of the designated time and date.

In addition, when the icon 41a or the character string 41b displayed on the standby screen 40 is selected, the mobile phone 1 activates a function linked with the character string 41b. Thus, the user can easily activate a previously set function when the designated time and date is reached.

In addition, before the designated time and date is reached, the mobile phone 1 displays the icon 41a in the superimposed manner on the standby screen 40 as the preliminary notification. Thus, the user may notice that the designated time and date is near. A clock, a calendar, or the like may be displayed on the standby screen 40, but the icon 41a is a relatively small image so that visibility of the clock or the like displayed on the standby screen 40 is scarcely impaired.

Let us assume that a screen displayed on the display unit 2 is not the standby screen 40, that is, that a screen displayed on the display unit 2 is the functional screen. In this case, when the designated time and date is reached, the mobile phone 1 executes the following control. After the above setting is made, when the user performs an operation, for example, for checking mail, the mobile phone 1 displays a mail viewing screen 52 on the display unit 2 as illustrated at step S15. Even when the functional screen such as the mail viewing screen 52 is displayed, the band-like pictography area 2a is disposed in the upper portion of the display unit 2.

When it is 10 minutes before the designated time and date, in a state in which the mail viewing screen 52 is displayed, the mobile phone 1 displays an icon 41c in the pictography area 2a according to the settings at step S16. The icon 41c is a relatively small image including a symbol of a telephone similarly to the icon 41a.

As described above, when the functional screen such as the mail viewing screen 52 is displayed on the display unit 2, the mobile phone 1 does not display the icon 41a in the superimposed manner over the functional screen but displays the icon 41c in the pictography area 2a as the preliminary notification.

Thus, the user may notice that the designated time and date is near while keeping the operability and the visibility of the functional screen.

In this embodiment, the icon 41c is displayed in the pictography area 2a, but the icon 41c may be displayed in any area other than the display area of the functional screen such as the mail viewing screen 52. For example, when an area for displaying information related to a status or a function key is disposed in a lower portion of the display unit 2, the icon 41c may be displayed in the area. When a sub display is provided on the back side of the first housing 1CA, the icon 41c may be displayed in the sub display. A character string or the like may be displayed instead of the icon 41c.

Then, when the designated time and date is reached in a state in which the mail viewing screen 52 is displayed on the display unit 2, the mobile phone 1 notifies the user of the advent of the designated time by the vibration of the mobile phone 1 itself at step S17.

As described above, when the functional screen such as the mail viewing screen 52 is displayed on the display unit 2, in order to notify the advent of the designated time, the mobile phone 1 vibrates itself without displaying the character string 41b in the superimposed manner on the functional screen. Thus, the user may notice the advent of the designated time while keeping the operability and the visibility of the functional screen.

Then, when the user who has noticed the advent of the designated time closes the functional screen such as the mail viewing screen 52, the mobile phone 1 displays the standby screen 40, on which the icon 41a and the character string 41b are superimposed, on the display unit 2 at step S13. When the user operates the operating unit 13 and selects the icon 41a or the character string 41b, the mobile phone 1 displays the phone call screen 51, which is the functional screen for making a phone call to a predetermined telephone number, on the display unit 2 at step S14.

FIG. 2 illustrates an example of notification based on a time and date, but the mobile phone 1 may perform notification based on a location. FIG. 3 is a diagram illustrating an example of notification based on a location. It is assumed that the user of the mobile phone 1 is supposed to send a mail to Mr. Tanaka whom the user will meet when the user arrives at a predetermined location. For this purpose, the mobile phone 1 is set to perform notification representing that a mail has to be sent to Mr. Tanaka when the current location is near a designated location. In addition, the mobile phone 1 is set to perform a preliminary notification when the current location is within 500 meters of the designated location.

After the above setting is made, for example, the standby screen 40 as illustrated at step S21 is displayed on the display unit 2 of the mobile phone 1. The band-like pictography area 2a is provided in the upper portion of the display unit 2.

When the current location is within 500 meters from the designated location in a state in which the standby screen 40 is displayed on the display unit 2, the mobile phone 1 displays an icon 42a in the superimposed manner on the standby screen 40 according to the setting at step S22. The icon 42a is a relatively small image that occupies a part of the standby screen 40 and has a shape of an envelope for suggesting the content of the notification to be performed at the designated location.

Then, when the current location reaches the designated location in a state in which the standby screen 40 is displayed on the display unit 2, the mobile phone 1 displays a character string 42b of "mail to Tanaka" in a superimposed manner on the standby screen 40 by associating with the icon 42a according to the setting at step S23. The character string 42b is linked with a function for sending a mail to a predetermined address. Then, when the icon 42a or the character string 42b is selected by an operation of the operating unit 13, the mobile phone 1 displays a mail sending screen 53, which is a functional screen for sending a mail to a predetermined address, on the display unit 2 at step S24.

As described above, when the current location reaches the designated location, the mobile phone 1 notifies the user of an arrival at the designated location by displaying the previously set character string 42b in the superimposed manner on the standby screen 40. Thus, the user may notice his or her arrival at the designated location and the purpose at the designated location.

In addition, when the icon 42a or the character string 42b displayed on the standby screen 40 is selected, the mobile phone 1 activates a function linked with the character string 42b. Thus, the user can easily activate a previously set function when the user arrives at the designated location.

In addition, before the user arrives at the designated location, the mobile phone 1 displays the icon 42a in the superimposed manner on the standby screen 40 as the preliminary notification. Thus, the user may notice that the designated location is near. A clock, a calendar, or the like may be displayed on the standby screen 40, but the icon 42a is a relatively small image so that visibility of the clock or the like displayed on the standby screen 40 is scarcely impaired.

Let us assume that a screen displayed on the display unit 2 is not the standby screen 40, that is, that a screen displayed on the display unit 2 is the functional screen. In this case, when the user arrives at the designated location, the mobile phone 1 executes the following control. After the above setting is made, when the user performs an operation for browsing mail, the mobile phone 1 displays a screen, for example, the mail viewing screen 52 as illustrated at step S25.

When the current location is within 500 meters of the designated location in a state in which the mail viewing screen 52 is displayed, the mobile phone 1 displays an icon 42c in the pictography area 2a according to the setting at step S26. The icon 42c is a relatively small image having a shape of an envelope similarly to the icon 42a.

As described above, when the functional screen such as the mail viewing screen 52 is displayed on the display unit 2, the mobile phone 1 does not display the icon 42a in the superimposed manner on the functional screen but displays the icon 42c in the pictography area 2a as the preliminary notification. Thus, the user may notice that the designated location is near while keeping the operability and the visibility of the functional screen.

Then, when the user arrives at the designated location in a state in which the mail viewing screen 52 is displayed on the display unit 2, the mobile phone 1 notifies the user of his or her arrival at the designated location by the vibration of the mobile phone 1 itself at step S27.

As described above, when the functional screen such as the mail viewing screen 52 is displayed on the display unit 2, in order to notify the arrival at the designated location, the mobile phone 1 vibrates itself without displaying the character string 42b in the superimposed manner on the functional screen. Thus, the user can notice the arrival at the designated location while keeping the operability and the visibility of the functional screen.

Then, when the user who has noticed the arrival at the designated location closes the functional screen such as the mail viewing screen 52, the mobile phone 1 displays the standby screen 40, on which the icon 42a and the character string 42b are superimposed, on the display unit 2 at step S23. When the user operates the operating unit 13 and selects the icon 42a or the character string 42b, the mobile phone 1 displays the mail sending screen 53, which is the functional screen for sending a mail to a predetermined address, on the display unit 2 at step S24.

Figure 4:
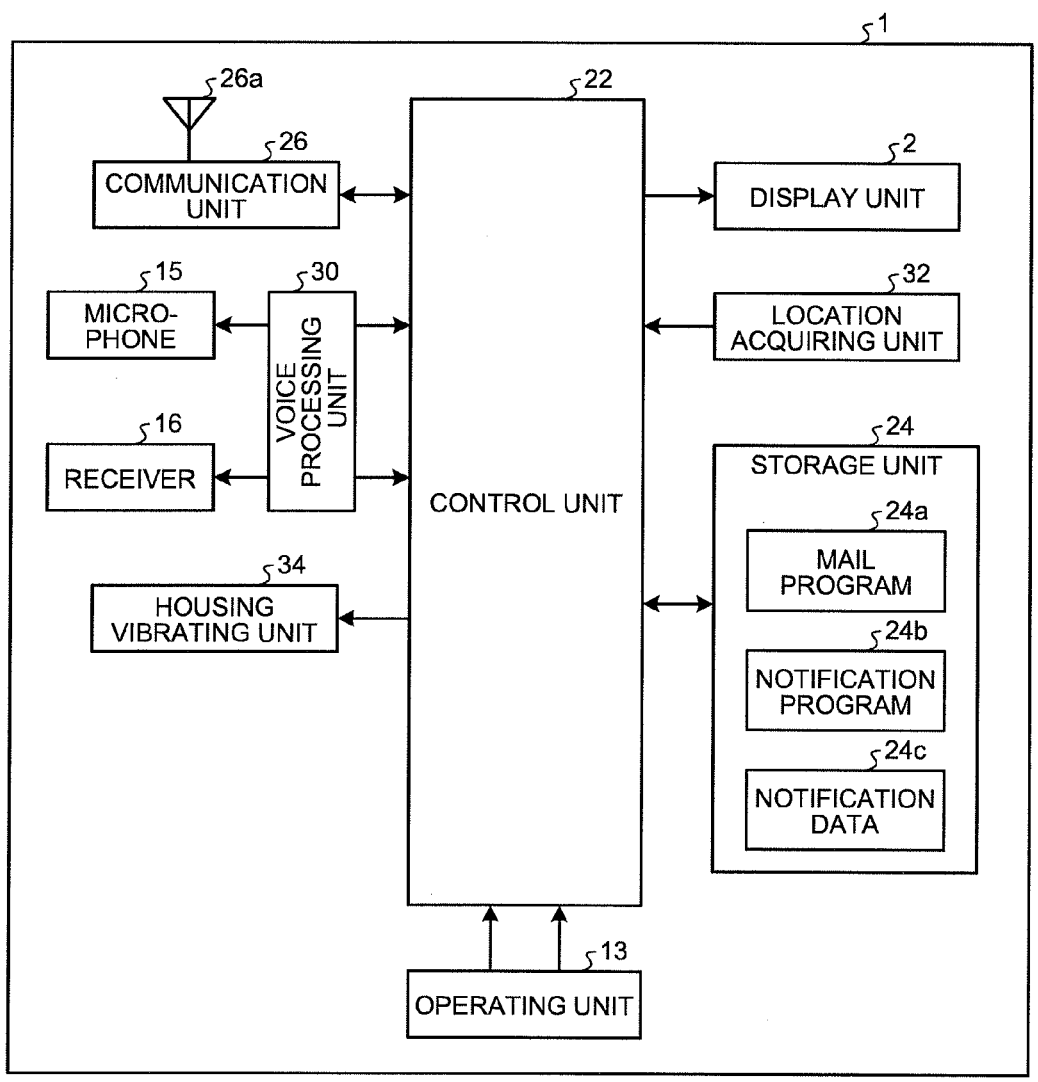
FIG. 4 is a block diagram illustrating a functional configuration of a mobile phone.

Next, a functional configuration of the mobile phone 1 will be described with reference to FIG. 4. FIG. 4 is a block diagram illustrating a functional configuration of the mobile phone 1. As illustrated in FIG. 4, the mobile phone 1 includes a control unit 22, a storage unit 24, a communication unit 26, the operating unit 13, a voice processing unit 30, the display unit 2, a location acquiring unit 32, and a housing vibrating unit 34.

The storage unit 24 includes one or more non-transitory storage medium, for example, a nonvolatile memory (such as ROM, EPROM, flash card etc.) and/or a storage device (such as magnetic storage device, optical storage device, solid-state storage device etc.).

The storage unit 24 stores therein data and programs used for processing by the control unit 22. Examples of the programs stored in the storage unit 24 include a mail program 24a and a notification program 24b. The data stored in the storage unit 24 includes notification data 24c. The mail program 24a refers to a program for implementing a function, for example, for sending, receiving, editing, and viewing mail. The notification program 24b refers to a program for implementing the above described notification function. The notification data 24c refers to setting data used by the notification function implemented by the notification program 24b.

The communication unit 26 includes an antenna 26a. The communication unit 26 establishes a wireless signal path with a base station via a channel allocated by the base station according to a code division multiple access (CDMA) scheme or any other wireless communication protocols, and performs a telephone call and information communication with the base station. Any other wired or wireless communication or network interfaces, e.g., LAN, Bluetooth, Wi-Fi, NFC (Near Field Communication) may also be included in lieu of or in addition to the communication unit 26. The operating unit 13 includes the operation keys 13A and the direction/decision key 13B. When the keys or buttons are operated by the user, the operating unit 13 generates a signal corresponding to the operation content. Then, the generated signal is input to the control unit 22 as the user's instruction.

The voice processing unit 30 processes a voice signal input from the microphone 15 or a voice signal to be output from the receiver 16. The display unit 2 includes a display panel configured with a liquid crystal display (LCD), an organic electro-luminescence (EL) panel, or the like and displays the standby screen, various kinds of functional screens, or the like based on the controls of the control unit 22.

The location acquiring unit 32 acquires the current location of the mobile phone 1. The current location is acquired, for example, through a global positioning system (GPS) or a base station with which the wireless signal path has been established. The housing vibrating unit 34 causes the mobile phone 1 to vibrate.

The control unit 22 integrally controls the overall operation of the mobile phone 1. That is, the control unit 22 controls the operation of the communication unit 26, the voice processing unit 30, the display unit 2, and the like such that various kinds of processes of the mobile phone 1 are executed in an appropriate order according to an operation of the operating unit 13 or software stored in the storage unit 24 of the mobile phone 1.

The control unit 22 executes processes based on a computer program (for example, an operating system (OS) program or an application program) stored in the storage unit 24.

The control unit 22 is configured with, for example, a microprocessing unit (MPU) and executes various kinds of processes of the mobile phone 1 in an order defined in the computer program. That is, the control unit 22 executes processes by reading a sequence of commands from the computer program stored in the storage unit 24.

The control unit 22 implements the above described notification function by reading a sequence of commands included in the notification program 24b and referring to information set to the notification data 24c, as part of control of the mobile phone 1.

Next, the notification data illustrated in FIG. 4 will be described in further detail with reference to FIG. 5. FIG. 5 is a diagram illustrating an example of the notification data 24c. As illustrated in FIG. 5, the notification data includes items such as Condition Type, First Condition, Second Condition, Deletion Condition, Display Character String, Image Data, Function, Parameter, and Display Status.

Stored under the item Condition Type is a value representing whether notification is performed based on time and date or location. For example, when the notification is performed based on time and date, "time and date" is stored under the item Condition Type. When the notification is performed based on location, "location" is stored under the item Condition Type.

Stored under the item First Condition is a value representing a condition for performing the preliminary notification. Stored under the item Second Condition is a value representing a condition for performing the notification. Stored under the item Deletion Condition is a value representing a condition for deleting corresponding data and for deleting the icon and the like displayed in a superimposed manner on the standby screen based on corresponding data. By deleting corresponding data based on the condition, the user's time and effort of deleting used data can be omitted. When corresponding data is desired to be deleted by the user's operation, the value under the item Deletion Condition is set to blank. For example, when it is desired to repetitively perform the notification many times based on the same condition, the value under the item Deletion Condition is set to blank.

Stored under the item Display Character String is a character string to be displayed when the condition stored under the item Second Condition is satisfied. Stored under the item Image Data is a name of image data to be displayed as the icon when the condition stored under the item First Condition is satisfied. Stored under the item Function is information for specifying a function to activate when the icon or the character string displayed in the superimposed manner on the standby screen is selected. Stored under the item Parameter is a parameter used for activating the function. In a case in which the value under item Function is set to blank, when the icon or the character string displayed in the superimposed manner on the standby screen is selected, a function for editing a value under the item Display Character String may be activated as a default function.

Stored under the item Display Status is a value representing the display status of corresponding data. For example, when nothing needs to be displayed, "0" is stored under the item Display Status. When only the icon is displayed on the standby screen, "1" is stored under the item Display Status. When both the icon and the character string are displayed on the standby screen, "2" is stored under the item Display Status.

In data in the first row in the example of FIG. 5, "time and date" is stored under the item Condition Type, "10 minutes before" is stored under the item First Condition, "2010/11/20 15:00" is stored under the item Second Condition, and "after 60 minutes" is stored under the item Deletion Condition. In addition, in the same data, "call to Suzuki" is stored under the item Display Character String, "phone.ico" is stored under the item Image Data, "phone.call" is stored under the item Function, "09012345678" is stored under the item Parameter, and "2" is stored under the item Display Status.

This data is setting data for implementing the notification illustrated in FIG. 2. The data represents that the notification should be performed at "2010/11/20 15:00" based on "time and date", that the preliminary notification should be performed when it is "10 minutes before" "2010/11/20 15:00", and that the data should be deleted when it is "after 60 minutes" from "2010/11/20 15:00". In addition, the data represents that the character string of "call to Suzuki" should be displayed for the notification, that the icon including the image having the name of "phone.ico" should be displayed for the preliminary notification, and that it is currently in a state in which the character string and the icon are displayed. In addition, the data represents that the function of making a phone call to the telephone number "09012345678" should be activated when the character string or the icon is selected.

In data in the second row in the example of FIG. 5, "location" is stored under the item Condition Type, "within 500 meters" is stored under the item First Condition, "35.670132, 139.744245" is stored under the item Second Condition, "beyond 1000 meters" is stored under the item Deletion Condition. In addition, in the same data, "mail to Tanaka" is stored under the item Display Character String, "mail.ico" is stored under the item Image Data, "mail.send" is stored under the item Function, "tanaka@example.com" is stored under the item Parameter, and "0" is stored under the item Display Status.

Figure 3:
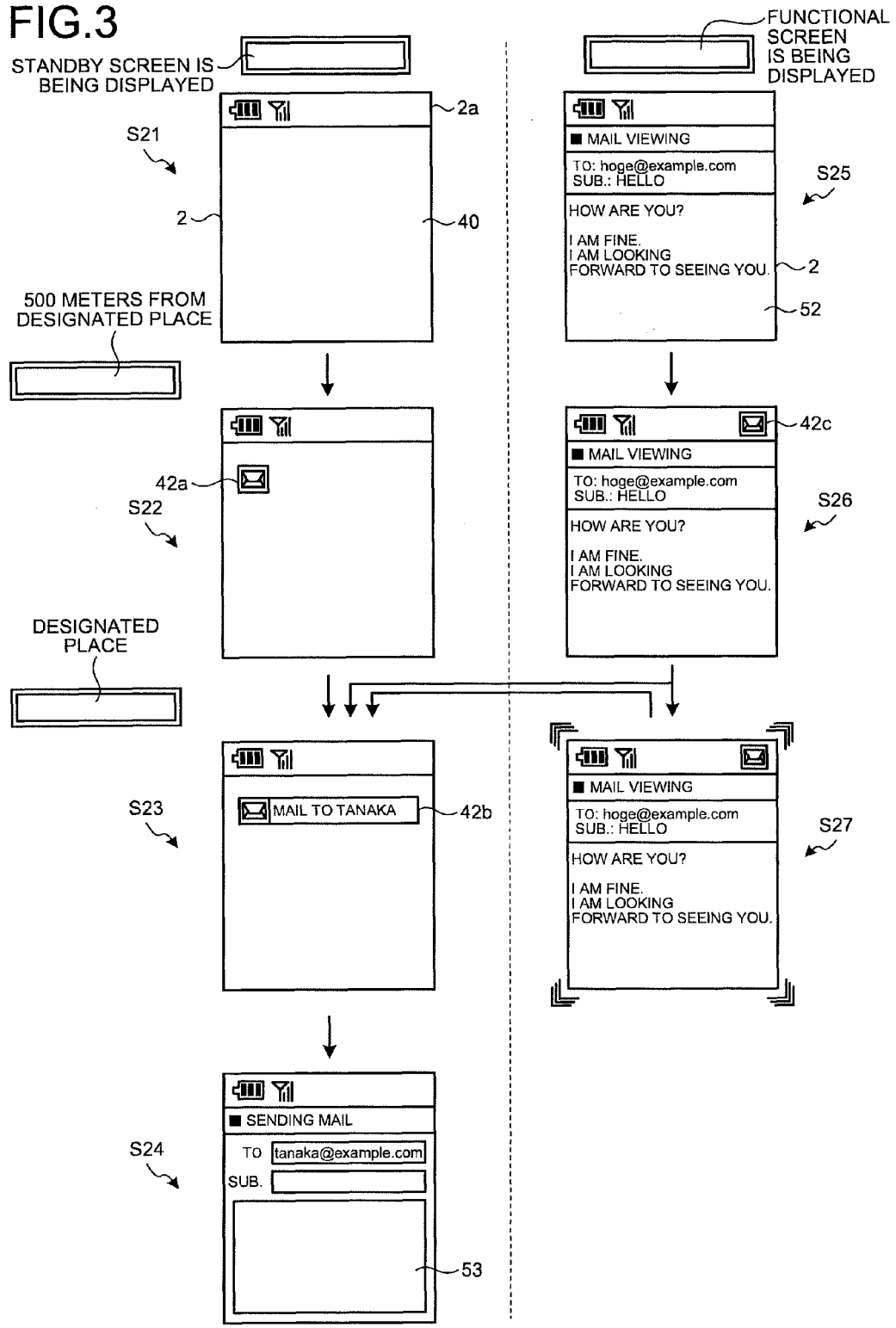
FIG. 3 is a diagram illustrating an example of notification based on a location.

The data is setting data for implementing the notification illustrated in FIG. 3. The data represents that the notification should be performed based on "location" when the latitude and the longitude of the current location reach "35.670132" and "139.744245", and that the preliminary notification should be performed when the user is "within 500 meters" from the location of "35.670132,139.744245". In addition, the data represents that the data should be deleted when the latitude and the longitude of the current location is "beyond 1000 meters" away from the location of "35.670132, 139.744245". In addition, the data represents that the character string of "mail to Mr. Tanaka" should be displayed for the notification, that the icon including the image having the name of "mail.ico" should be displayed for the preliminary notification, and that it is currently in a state in which neither the character string nor the icon is displayed. In addition, the data represents that a function of sending a mail to the address of "tanaka@ example.com" should be activated when the character string or the icon is selected.

In data in the third row in the example of FIG. 5, "time and date" is stored under the item Condition Type, "30 minutes before" is stored under the item First Condition, "2010/11/22 11:00" is stored under the item Second Condition, and value under the item Deletion Condition is set to blank. In addition, in the same data, "meeting" is stored under the item Display Character String, "meeting.ico" is stored under the item Image Data, values under the items Function and Parameter are set to blank, and "1" is stored under the item Display Status.

This data represents that the notification should be performed at "2010/11/22 11:00" based on "time and date", and that the preliminary notification should be performed when it is "30 minutes before" "2010/11/22 11:00". In addition, the data represents that the corresponding data is deleted by the user's operation. In addition, the data represents that the character string of "meeting" should be displayed for the notification, that the icon including the image having the name of "meeting.ico" should be displayed for the preliminary notification, and that it is currently in a state in which only the icon is displayed. In addition, the data represents that a function of editing the character string displayed on the standby screen 40 should be activated when the character string or the icon is selected.

The notification data 24c is added, updated, and deleted by the control unit 22 based on an operation which the user performs on an edit screen provided by, for example, the notification program 24b.

Figure 6:
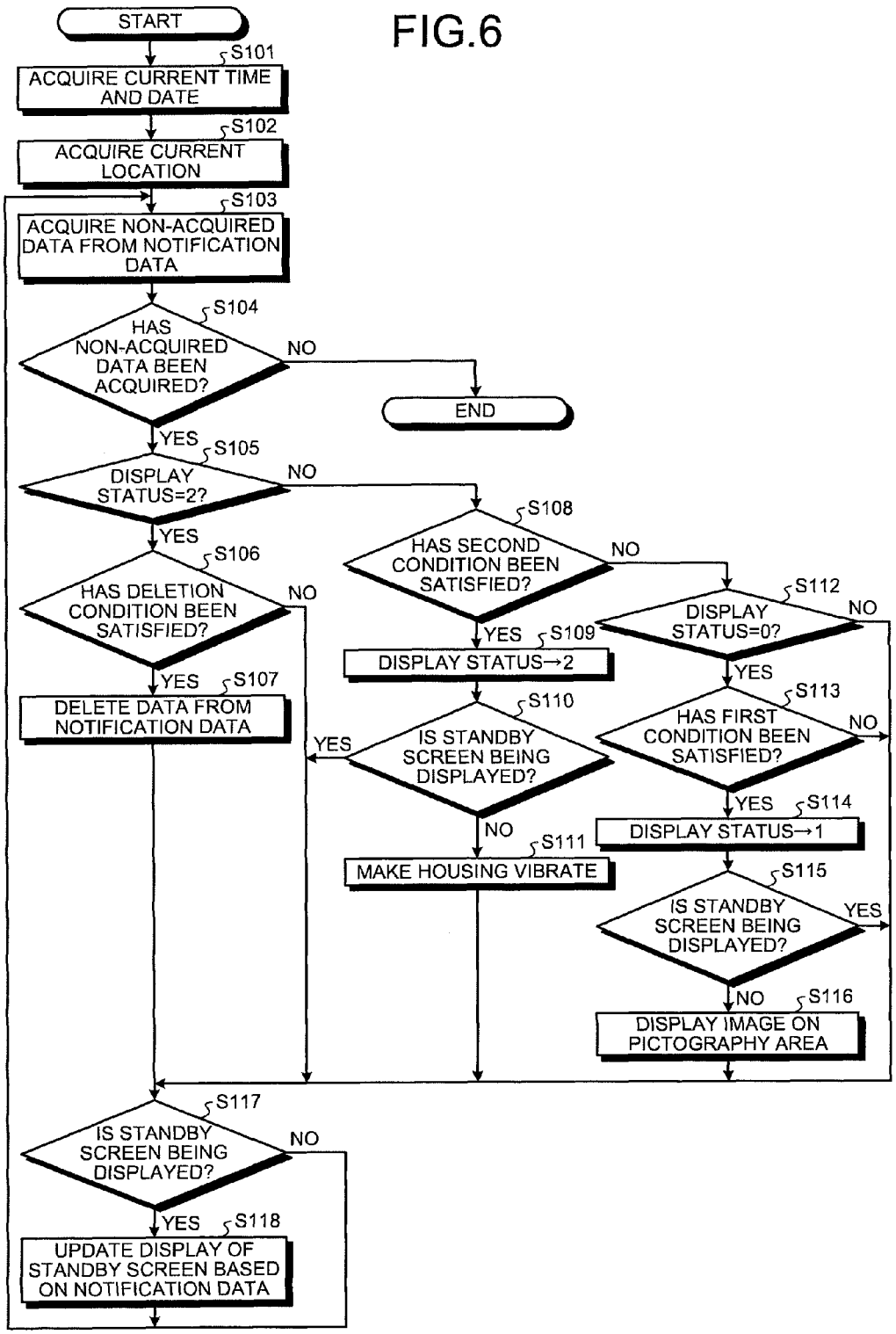
FIG. 6 is a flowchart illustrating a processing procedure of a notification process performed by a control unit.

Next, a processing procedure of a process executed by the control unit 22 based on the notification program 24b will be described with reference to FIGS. 6 and 7. FIG. 6 is a flowchart illustrating a processing procedure of a notification process performed by the control unit 22. The notification process illustrated in FIG. 6 is repetitively executed by the control unit 22.

In the notification process, at step S101, the control unit 22 acquires the current time and date. At step S102, the control unit 22 acquires the current location from the location acquiring unit 32. Then, at step S103, the control unit 22 acquires apiece of non-acquired data from the notification data 24c.

Here, when the non-acquired data has been acquired (Yes at step S104), at step S105, the control unit 22 determines whether the value under the item Display Status is "2". As described above, when the value under the item Display Status is "2", it means that it has already been placed in a state in which the character string and the icon corresponding to the corresponding data should be displayed.

When the value under the item Display Status is "2" (Yes at step S105), the control unit 22 determines whether the condition stored under the item Deletion Condition has been satisfied at step S106. When the condition has been satisfied (Yes at step S106), the control unit 22 deletes the corresponding data from the notification data 24c at step S107. When the condition has not been satisfied (No at step S106), the corresponding data is not deleted. The condition may not be satisfied when there is no condition stored under the item Deletion Condition. Subsequently, the control unit 22 executes the process of step S117 and the process subsequent thereto.

Meanwhile, when the value under the item Display Status is not "2" (No at step S105), the control unit 22 determines whether the condition stored under the item Second Condition has been satisfied at step S108. When the condition has been satisfied (Yes at step S108), the control unit 22 changes the value under the item Display Status of the corresponding data to "2" at step S109.

Subsequently, the control unit 22 determines whether the standby screen 40 is being displayed on the display unit 2 at step S110. When the standby screen 40 is not being displayed on the display unit 2 (No at step S110), the control unit 22 controls the housing vibrating unit 34 such that the mobile phone 1 vibrates as an alarm at step S111. When the standby screen 40 is being displayed on the display unit 2 (Yes at step S110), the control unit 22 does not vibrate the mobile phone 1. Subsequently, the control unit 22 executes the process of step S117 and the process subsequent thereto.

Meanwhile, when the condition stored under the item Second Condition has not been satisfied (No at step S108), the control unit 22 determines whether the value under the item Display Status is "0" at step S112. As described above, when the value under the item Display Status is "0", it means that it is in a state in which neither the character strings nor the icon corresponding to the corresponding data should be displayed.

When the value under the item Display Status is not "0", that is, when the value under the item Display Status is "1" (No at step S112), the control unit 22 executes the process of step S117 and the process subsequent thereto. When the value under the item Display Status is "1", it means that it is in a state in which the icon corresponding to the corresponding data should be displayed. That is, when the value under the item Display Status is "1", it means that the condition stored under the item Second Condition has not been satisfied but the condition stored under the item First Condition has been satisfied.

Meanwhile, when the value under the item Display Status is "0" (Yes at step S112), the control unit 22 determines whether the condition stored under the item First Condition has been satisfied at step S113. When the condition has been satisfied (Yes at step S113), the control unit 22 changes the value under the item Display Status of the corresponding data to "1" at step S114.

Subsequently, the control unit 22 determines whether the standby screen 40 is being displayed on the display unit 2 at step S115. When the standby screen 40 is not being displayed on the display unit 2 (No at step S115), the control unit 22 displays the icon including the image having the name stored under the item Image Data in the pictography area 2a for alarming at step S116. Subsequently, the control unit 22 executes the process of step S117 and the process subsequent thereto. When the condition stored under the item First Condition has not been satisfied (No at step S113) or when the standby screen 40 is being displayed on the display unit 2 (Yes at step S115), the control unit 22 executes the process of step S117 and the process subsequent thereto.

At step S117, the control unit 22 determines whether the standby screen 40 is being displayed on the display unit 2. When the standby screen 40 is being displayed on the display unit 2 (Yes at step S117), the control unit 22 updates a display of the standby screen 40 based on the notification data 24c at step S118. When the data is deleted from the notification data 24c at step S107, the character string or the icon corresponding to the deleted data is erased at step S118. When the value under the item Display Status is updated to "2" at step S109, the character string and the icon corresponding to the updated data are displayed in a superimposed manner on the standby screen 40 in an associated form at step S118. When the value under the item Display Status is updated to "1" at step S114, the icon corresponding to the updated data is displayed in a superimposed manner on the standby screen 40 at step S118. Meanwhile, when the standby screen 40 is not being displayed on the display unit 2 (No at step S117), the standby screen 40 is not updated. Then, the control unit 22 re-executes the process of step S103 and the process subsequent thereto. When the non-acquired data has not been acquired at step S104 (No at step S104), the control unit 22 terminates the notification process, and then restart the notification process again.

Figure 7:
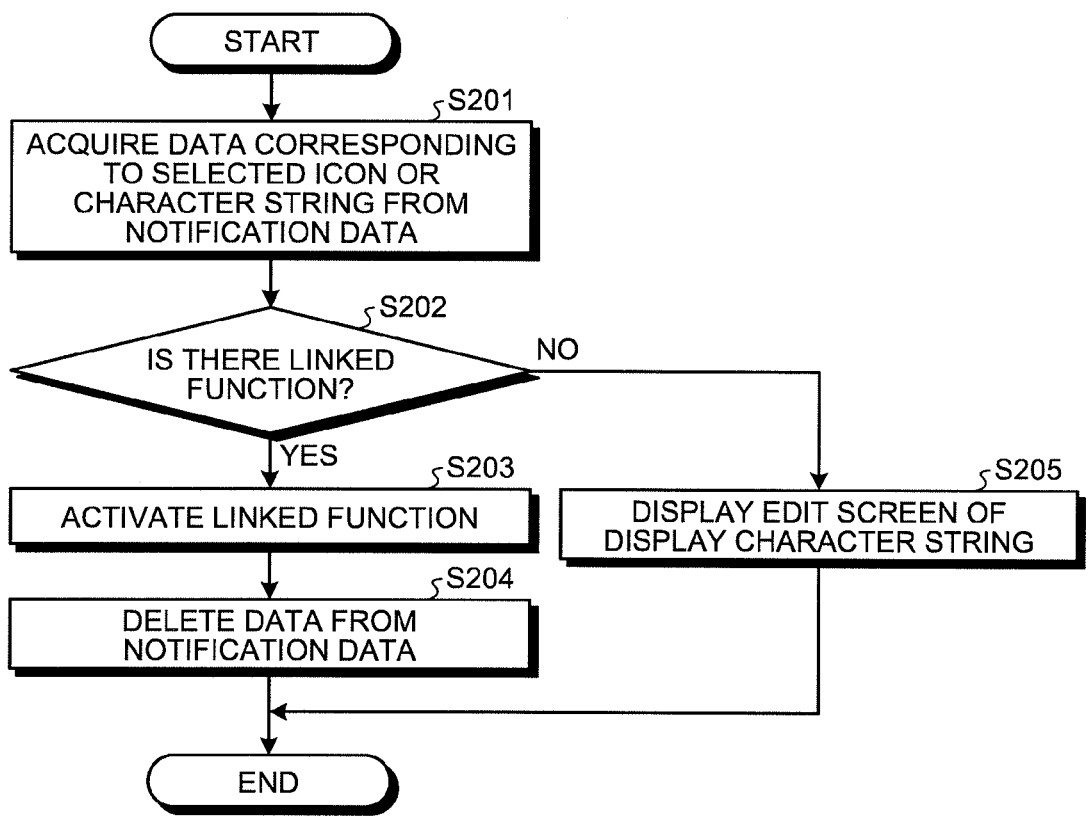
FIG. 7 is a flowchart illustrating a processing procedure of a function activating process performed by a control unit.

FIG. 7 is a flowchart illustrating a processing procedure of a function activating process performed by the control unit 22. The function activating process illustrated in FIG. 7 is executed by the control unit 22 each time when the user selects the icon or the character string displayed in a superimposed manner on the standby screen 40.

In the function activating process, the control unit 22 acquires data corresponding to the selected icon or the character string from the notification data 24c at step S201. Then, the control unit 22 determines whether a value has been set under the item Function of the acquired data, that is, whether there is a function linked with the selected icon or the character string, at step S202.

When there is a function linked with the selected icon or the character string (Yes at step S202), the control unit 22 activates the function at step S203. Then, the control unit 22 deletes the data corresponding to the selected icon or the character string from the notification data 24c at step S204. The display of icon and the character string corresponding to the deleted data is erased from the standby screen 40 by the notification process illustrated in FIG. 6. By deleting the data after activating the function as described above, the user's time and effort for deleting the used data can be reduced.

When there is no function linked with the selected icon or the character string (No at step S202), the control unit 22 displays the edit screen for editing the character string on the display unit 2 at step S205.

The aspects of the embodiments can be arbitrarily changed without departing from the spirit and the scope of the present invention. For example, the notification program 24b may be divided into a plurality of modules or may be integrated with another program.

In the embodiment, when the functional screen is being displayed, the icon is displayed on the pictography area for the preliminary notification, and the mobile phone 1 is vibrated for the notification. However, the notification may be performed in any method to the extent that, for example, visibility of the functional screen is not impaired. For example, the notification and/or the preliminary notification may be performed using a sound or light (flickering of a lamp or the like). Both the notification and the preliminary notification may be performed using vibration. The notification may be performed by using any of a display on the pictography area or the like, vibration, a sound, light, or the like, etc. in combination.

In the embodiment, when the standby screen is being displayed, the notification or the preliminary notification is performed by displaying the character string or the icon on the screen. However, the notification and/or the preliminary notification may be performed using another method in combination. For example, a sound and a signal may be used in combination.

In the embodiment, when the standby screen is being displayed, the character string or the icon is deleted after the function linked with the character string or the icon is activated. However, the character string or the icon may remain even after the function linked with the character string or the icon is activated.

In a case in which the condition changes and thus the condition set under the item First Condition becomes unsatisfied after the condition set under the item First Condition is satisfied once, the character string and/or the icon displayed in the superimposed manner on the standby screen may be erased. For example, when a predetermined time period elapses from the designated time and date, the character string and/or the icon displayed in the superimposed manner on the standby screen may be erased. Through this control, the user's time and effort for deleting the used data can be reduced.

The advantages are that one embodiment of the invention provides the mobile electronic device, the notification control method, and the storage medium storing therein the notification program capable of performing notification without interfering with the process being executed by the user.

What is claimed is:

1. A mobile electronic device, comprising:
a display unit configured to display a first screen or a second screen;

a storage unit configured to store therein
a character string in association with a condition, and
an image in association with said condition and a further condition; and
a control unit configured
to determine whether the condition is satisfied,
to determine whether the first screen or the second screen is displayed on the display unit,
to display the character string on the first screen in a superimposed manner in a case where the first screen is displayed on the display unit and the condition is satisfied, and
not to display the character string on the second screen in a case where the second screen is displayed on the display unit and the same condition is satisfied,
wherein
the second screen is a screen displayed when one of functions provided by the mobile electronic device is executed,
when the first screen is displayed,
when the further condition is satisfied, the control unit is configured to start displaying the image on the first screen,
when the condition is satisfied, the control unit is configured to start displaying the character string on the first screen, and
when said character string or said image displayed on the first screen is selected, the control unit is configured to activate an activatable function linked with the character string or the image, and
when the second screen is displayed,
when the further condition is satisfied, the control unit is configured to start displaying the image in an area in the second screen, said area being irrelevant to the execution of the function, and
when the condition is satisfied, the control unit is configured to perform a notification to a user of the mobile electronic device.

2. The mobile electronic device according to claim 1, wherein
the control unit is configured to activate the activatable function in a case where the character string displayed on the first screen in the superimposed manner is selected and the activatable function is linked with the character string.

3. The mobile electronic device according to claim 2, the control unit is configured to activate a function for editing the character string in a case where the character string displayed on the first screen in the superimposed manner is selected and the activatable function is linked with the image but is not linked with the character string.

4. The mobile electronic device according to claim 2, wherein the control unit is configured to erase display of the character string in a case where the first screen is displayed on the display unit after the activatable function linked with the character string is activated.

5. The mobile electronic device according to claim 2, wherein
the storage unit is configured to store the character string in association with the image, and
the control unit is configured to display the image stored in association with the character string on the first screen in a superimposed manner in association with the character string, and to activate the activatable function linked with the character string corresponding to the image in a case where the image displayed on the first screen is selected.

6. The mobile electronic device according to claim 1, wherein the control unit is configured to erase display of the character string in a case where the condition becomes unsatisfied while the character string is displayed on the first screen in the superimposed manner.

7. The mobile electronic device according to claim 1, wherein the control unit is configured to perform the notification, in a case where the condition is satisfied while the second screen is displayed on the display unit or while the display unit is in a non-display mode, using at least one of vibration, sound, light, and displaying information on a portion of the display unit, the portion being other than a portion where the second screen is displayed.

8. The mobile electronic device according to claim 1, wherein the condition is related to a time and date, and
the control unit is configured to determine whether the condition is satisfied based on a current time and date.

9. The mobile electronic device according to claim 1, further comprising a location acquiring unit configured to acquire a current location, wherein
the condition is related to a location, and
the control unit is configured to determine whether the condition is satisfied based on the current location acquired by the location acquiring unit.

10. The mobile electronic device according to claim 1, wherein
when the second screen is closed after the notification is performed, the control unit is configured to display the first screen in which the character string and the image are displayed.

11. The mobile electronic device according to claim 10, wherein the first screen is a standby screen.

12. A non-transitory storage medium that stores a notification program for causing a mobile electronic device, which includes a storage unit and a display unit for displaying a first screen or a second screen, to execute:
storing, in the storage unit,
a character string in association with a condition, and
an image in association with said condition and a further condition;
determining whether the condition has been satisfied;
determining whether the first screen or the second screen is displayed on the display unit;
displaying the character string on the first screen in a superimposed manner in a case where the first screen is displayed on the display unit and the condition is satisfied; and
not displaying the character string on the second screen in a case where the second screen is displayed on the display unit and the same condition is satisfied,
wherein
the second screen is a screen displayed when one of functions provided by the mobile electronic device is executed, and
the program, when executed by the device, causes the mobile electronic device to further execute
when the first screen is displayed,
when the further condition is satisfied, starting displaying the image on the first screen,
when the condition is satisfied, starting displaying the character string on the first screen, and
when said character string or said image displayed on the first screen is selected, activating an activatable function linked with the character string or the image, and when the second screen is displayed,
   when the further condition is satisfied, starting displaying the image in an area in the second screen, said area being irrelevant to the execution of the function, and
   when the condition is satisfied, performing a notification to a user of the mobile electronic device.

\* \* \* \* \*